United States Patent
Hochi

(10) Patent No.: US 7,174,937 B2
(45) Date of Patent: Feb. 13, 2007

(54) RUBBER COMPOSITION FOR TIRE AND RUN FLAT TIRE USING THE SAME

(75) Inventor: Kazuo Hochi, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 72 days.

(21) Appl. No.: 11/052,903

(22) Filed: Feb. 9, 2005

(65) Prior Publication Data

US 2005/0209393 A1    Sep. 22, 2005

(30) Foreign Application Priority Data

Mar. 17, 2004    (JP)    ............................. 2004-075804

(51) Int. Cl.
 *B60C 17/00*    (2006.01)
 *B60C 17/06*    (2006.01)
 *B60C 17/08*    (2006.01)

(52) U.S. Cl. ...................................... 152/516; 152/517

(58) Field of Classification Search .................... None
See application file for complete search history.

(56) References Cited

U.S. PATENT DOCUMENTS 4,714,734 A * 12/1987 Hashimoto et al. ......... 524/496
5,512,626 A * 4/1996 Matsuo et al. ........... 152/209.5
6,814,118 B2 * 11/2004 Narahara et al. ........... 152/510
2001/0051685 A1    12/2001 Obrecht et al.

FOREIGN PATENT DOCUMENTS

| EP | 0 647 675 A1 | 4/1995 |
| EP | 1 207 179 A1 | 5/2002 |
| JP | 5-320421 A | 12/1993 |
| JP | 7-109384 A | 4/1995 |
| JP | 2002-37927 A | 2/2002 |
| JP | 2002-79803 A | 3/2002 |
| JP | 2002-155169 A | 5/2002 |

* cited by examiner

*Primary Examiner*—Justin R. Fischer
(74) *Attorney, Agent, or Firm*—Birch, Stewart, Kolasch & Birch, LLP

(57) ABSTRACT

The present invention provides a rubber composition for a tire, which achieves both low heat generating properties and high strength and improves durability of a run flat tire, and a run flat tire obtained using the rubber composition. Specifically, the present invention provides a rubber composition for a tire comprising 10 to 100 parts by weight of carbon black having nitrogen-adsorbing specific surface area of 30 to 100 m$^2$/g and dibutyl phthalate oil absorption of at least 50 ml/100 g, and at least 2 parts by weight of a vulcanizing agent, based on 100 parts by weight of a rubber component containing 10 to 50% by weight of star-shaped solution polymerization butadiene rubber, and a run flat tire using the composition as the reinforcing rubber layer of the sidewall.

11 Claims, No Drawings

RUBBER COMPOSITION FOR TIRE AND RUN FLAT TIRE USING THE SAME

BACKGROUND OF THE INVENTION

The present invention relates to a rubber composition for a tire and a run flat tire using the rubber composition for the reinforcing rubber layer of the sidewall.

At present, a run flat tire having a reinforcing rubber layer of high hardness positioned on the inside of the sidewall has been realized and such a tire can run for a certain distance even when air pressure is lost due to puncture of the tire. As a result, a spare tire does not always need to be carried and the weight of the vehicle as a whole can be reduced. However, the speed and distance that can be run by a run flat tire when punctured is limited and further improvement in durability of a run flat tire is desired.

An example of an effective means to improve durability of a run flat tire is the method of suppressing deformation by thickening the reinforcing rubber layer, thereby preventing damage due to deformation. However, because the weight of the tire increases, this method counters the initial purpose of a run flat tire, which is to become lightweight.

Another example of an effective means to improve durability of a run flat tire is the method of increasing the hardness of the reinforcing rubber by compounding an increased amount of a reinforcing filler such as carbon black, thereby suppressing deformation. However, improvement of run flat durability is not satisfactory, as the load to processes such as kneading and extruding is large and also, heat generating properties become high after vulcanization.

Furthermore, an example of a method for suppressing deformation and heat generation is the method of increasing vulcanization density by using a large amount of a vulcanizing agent and a vulcanization accelerator, without increasing the amount of carbon black (for example, see JP-A-2002-155169). However, elongation and strength at break of the rubber decrease.

SUMMARY OF THE INVENTION

The present invention aims to provide a rubber composition for a tire, which achieves both low heat generating properties and high strength and improves durability of a run flat tire, and a run flat tire obtained using the rubber composition.

The present invention relates to a rubber composition for a tire comprising 10 to 100 parts by weight of carbon black having nitrogen-adsorbing specific surface area of 30 to 100 $m^2/g$ and dibutyl phthalate oil absorption of at least 50 ml/100 g, and at least 2 parts by weight of a vulcanizing agent, based on 100 parts by weight of a rubber component containing 10 to 50% by weight of star-shaped solution polymerization butadiene rubber; wherein the solution polymerization butadiene rubber has a vinyl bond amount of 5 to 20% by weight, coupling ratio by tin tetrachloride of at least 25% and molecular weight distribution of 1.2 to 3.

The rubber composition preferably comprises at least one mica selected from the group consisting of kaolinite, sericite, phlogopite and muscovite.

Also, the present invention relates to a run flat tire comprising the rubber composition for a tire for the reinforcing rubber layer of the sidewall.

DETAILED DESCRIPTION

The rubber composition for a tire of the present invention comprises a rubber component, carbon black and a vulcanizing agent.

The rubber component contains star-shaped solution polymerization butadiene rubber. Herein, the star-shaped solution polymerization butadiene rubber refers to butadiene rubber, which has two peaks in molecular weight distribution (Mw/Mn) due to being coupled after polymerization using, for example, tin tetrachloride.

The vinyl bond amount of the star-shaped solution polymerization butadiene rubber is 5 to 20% by weight. When the vinyl bond amount is less than 5%, preparation of the rubber composition is difficult. Also, when the vinyl bond amount is more than 20% by weight, run flat durability decreases.

The star-shaped solution polymerization butadiene rubber is coupled by tin tetrachloride and the coupling ratio is at least 25%, preferably at least 30%. When the coupling ratio is lower than 25%, storage stability decreases and the rubber tends to flow easily. Also, the coupling ratio is preferably at most 60%. When the coupling ratio is higher than 60%, the viscosity of the polymer increases and preparation of the rubber composition tends to become difficult.

The molecular weight distribution (Mw/Mn) of the star-shaped solution polymerization butadiene rubber is at least 1.2, preferably at least 1.5. When Mw/Mn is lower than 1.2, processability in preparation of the rubber composition decreases. Also, Mw/Mn is at most 3, preferably at most 2.5. When Mw/Mn is higher than 3, heat generation is large and run flat durability decreases.

The content of the star-shaped solution polymerization butadiene rubber in the rubber component is at least 10% by weight, preferably at least 15% by weight. When the content is less than 10% by weight, the effect obtained by compounding the star-shaped solution polymerization butadiene rubber is insufficient. Also, heat generation due to deformation under run flat conditions becomes large and thermal degradation of the rubber is promoted, leading to destruction of the tire. Also, the content is at most 50% by weight, preferably at most 40% by weight. When the content is more than 50% by weight, strength at break and run flat durability decrease.

Examples of the rubber component besides the star-shaped solution polymerization butadiene rubber are diene synthetic rubbers such as natural rubber (NR), butadiene rubber (BR), syndiotactic 1,2-polybutadiene (1,2-BR), styrene-butadiene copolymer rubber (SBR), isoprene rubber (IR), acrylonitrile-butadiene copolymer rubber (NBR), chloroprene rubber (CR), styrene-isoprene-butadiene copolymer rubber (SIBR), styrene-isoprene copolymer rubber and isoprene-butadiene copolymer rubber. These can be used alone or two or more kinds can be used together, but particularly, from the viewpoint of low heat generating properties, NR and BR are preferably used together with the star-shaped solution polymerization butadiene rubber.

The nitrogen-adsorbing specific surface area ($N_2SA$) of the carbon black used in the present invention is at least 30 $m^2/g$, preferably at least 35 $m^2/g$. When $N_2SA$ of the carbon black is less than 30 $m^2/g$, reinforcing properties and durability are insufficient. Also, $N_2SA$ of the carbon black is at most 100 $m^2/g$, preferably at most 60 $m^2/g$. When $N_2SA$ of the carbon black is more than 100 $m^2/g$, heat generating properties become high.

The dibutyl phthalate oil absorption (DBP oil absorption) of the carbon black is at least 50 ml/100 g, preferably at least 80 ml/100 g. When the DBP oil absorption is less than 50 ml/100 g, sufficient reinforcing properties are difficult to obtain.

The content of carbon black is at least 10 parts by weight, preferably at least 20 parts by weight, more preferably at least 30 parts by weight, based on 100 parts by weight of the rubber component. When the content of carbon black is less than 10 parts by weight, strength of the rubber composition is insufficient. Also, the content of carbon black is at most 100 parts by weight, preferably at most 70 parts by weight, more preferably at most 60 parts by weight. When the content of carbon black is more than 100 parts by weight, kneading and extruding the rubber is difficult when preparing the rubber composition.

Examples of the vulcanizing agent used in the present invention are sulfur and sulfur compounds. Of these, from the viewpoint of preventing surface precipitation of sulfur, insoluble sulfur is preferably used as the vulcanizing agent.

The average molecular weight of the insoluble sulfur is preferably at least 10,000, more preferably at least 100,000. When the average molecular weight is less than 10,000, decomposition at a low temperature tends to occur and surface precipitation tends to occur. Also, the average molecular weight of the insoluble sulfur is preferably at most 500,000, more preferably at most 300,000. When the average molecular weight is more than 500,000, dispersability in rubber tends to decrease.

The amount of the vulcanizing agent is at least 2 parts by weight based on 100 parts by weight of the rubber component. When the amount is less than 2 parts by weight, the hardness of the obtained rubber composition is insufficient. Also, the amount of the vulcanizing agent is preferably at most 12 parts by weight, more preferably at most 8 parts by weight, further preferably at most 6 parts by weight. When the amount is more than 12 parts by weight, storage stability of the unvulcanized rubber tends to be lost.

The rubber composition for a tire of the present invention preferably further contains at least one mica selected from the group consisting of kaolinite, sericite, phlogopite and muscovite. Of these, from the viewpoint of balance of hardness and strength at break, sericite is preferably used as the mica.

The aspect ratio (ratio of maximum diameter to thickness) of the mica is preferably at least 3, more preferably at least 5, further preferably at least 10. When the aspect ratio is lower than 3, sufficient rubber hardness may not be obtained. Also, the aspect ratio of the mica is preferably at most 30, more preferably at most 20. When the aspect ratio is larger than 30, dispersability in rubber and strength at break decrease. The aspect ratio is found by measuring the major axis and the minor axis of 50 random particles of the mica observed by an electron microscope and calculating a/b from the average major axis a and average minor axis b.

The average particle size of the mica is preferably at least 2 μm, more preferably at least 5 μm, further preferably at least 10 μm. When the average particle size is less than 2 μm, costs for pulverization are high and sufficient rubber hardness cannot be obtained. Also, the average particle size of mica is at most 30 μm, preferably at most 20 μm. When the average particle size is more than 30 μm, the mica become a site for destruction and bending fatigue resistance decreases. The average particle size refers to the average value of the major axis of the mica.

The content of the mica is preferably at least 5 parts by weight, more preferably at least 10 parts by weight, based on 100 parts by weight of the rubber component. When the content is less than 5 parts by weight, the effects obtained by adding the mica tend to be insufficient. Also, the content of the mica is preferably at most 120 parts by weight, more preferably at most 80 parts by weight. When the content is more than 120 parts by weight, dispersing the mica in rubber becomes difficult and also, heat tends to be generated.

Furthermore, to the rubber composition for a tire of the present invention, a silane coupling agent is preferably added together with the mica.

Examples of the silane coupling agent are bis(3-triethoxysilylpropyl)tetrasulfide, bis(3-trimethoxysilylpropyl)tetrasulfide, bis(2-triethoxysilylpropyl)tetrasulfide, 3-mercaptopropyltriethoxysilane and 2-mercaptoethyltrimethoxysilane. These may be used alone or any combination thereof may be used.

The amount of the silane coupling agent is preferably at least 2 parts by weight, more preferably at least 4 parts by weight, based on 100 parts by weight of the mica. When the amount is less than 2 parts by weight, the effect of adding the silane coupling agent cannot sufficiently be obtained. Also, the amount is preferably at most 20 parts by weight, more preferably at most 15 parts by weight. When the amount is more than 20 parts by weight, the effect of adding the silane coupling agent cannot sufficiently be obtained, although costs are high.

Furthermore, the rubber composition for a tire of the present invention can contain zinc oxide, wax, stearic acid, oil, antioxidants and vulcanization accelerators that are usually used in rubber compositions, within the range that the effects of the present invention are not lost.

Various compounds can be used as the vulcanization accelerator, but particularly, sulfenamide accelerators are most frequently used as delayed vulcanization accelerators, for the reasons that scorching tends not to occur in the preparation process and vulcanization properties are excellent. Also, with respect to rubber properties after vulcanization, a rubber composition that is prepared using a sulfenamide accelerator has low heat generating properties to deformation caused by external forces and therefore, the effect regarding the most important object of the present invention, that is, to improve durability of a run flat tire, is large.

Examples of the sulfenamide accelerator are TBBS (N-tert-butyl-2-benzothiazolylsulfenamide), CBS (N-cyclohexyl-2-benzothiazolylsulfenamide) and DZ (N,N'-dicyclohexyl-2-benzothiazolylsulfenamide). As other vulcanization accelerators, MBT (mercaptobenzothiazol), MBTS (dibenzothiazyldisulfide) and DPG (diphenylguanidine) can be used.

Loss modulus (E") and complex modulus (E*) of the rubber composition for a tire of the present invention preferably satisfy the following equation.

$$E''/(E^*)^2 \leq 7.0 \times 10^{-9} \text{ Pa}^{-1}$$

When $E''/(E^*)^2$ is larger than $7.0 \times 10^{-9}$ Pa$^{-1}$, heat generation due to deformation under run flat conditions is large and thermal degradation of the rubber is promoted, leading to destruction of the tire.

The strength at break ($T_B$) of the rubber composition for a tire of the present invention is preferably at least 10 MPa, more preferably at least 12 MPa. When $T_B$ is less than 10

MPa, the reinforcing rubber layer is damaged due to bending caused by load of the vehicle when run under run flat conditions and run flat performance tends to be extremely insufficient.

The rubber composition for a tire of the present invention is used as a reinforcing rubber layer for a run flat tire. Herein, reinforcing rubber layer refers to the lining strip layer positioned on the inside of the sidewall of a run flat tire. When the reinforcing rubber layer is present in a run flat tire, the vehicle can be supported even when air pressure is lost and excellent run flat durability can be provided.

The present invention is explained in detail based on Examples below, but the present invention is not limited thereto.

The various chemicals used in Examples and Comparative Examples are described below.

NR: RSS #3
BR 1: VCR 412 available from Ube Industries, Ltd.
BR 2: BR1250H (coupling ratio by tin tetrachloride: 30 to 40%, molecular weight distribution (Mw/Mn): 1.6 to 1.7, vinyl bond amount: 17% by weight, Low-Cis type) available from Zeon Corporation
Carbon black FEF: DIABLACK E ($N_2SA$: 41 $m^2$/g, DBP oil absorption: 115 ml/100 g) available from Mitsubishi Chemical Corporation
Sericite: KM-8 (aspect ratio: 15, average particle size: 17 μm) available from Nippon Forum Co., Ltd.
Stearic acid: Tsubaki available from NOF Corporation
Zinc oxide: Zinc oxide type 2 available from Mitsui Mining and Smelting Co., Ltd.
Antioxidant: Antigen 6C available from Sumitomo Chemical Co., Ltd.
Silane coupling agent: Si-75 available from Degussa Hules Co.
Insoluble sulfur: Mu-cron OT available from Shikoku Corp.
Vulcanization accelerator: Nocceler NS (N-tert-butyl-2-benzothiazolylsufenamide) available from Ohuchi Shinko Chemical Industrial Co., Ltd.

EXAMPLES 1 AND 2 AND COMPARATIVE EXAMPLES 1 AND 2

According to the compositions shown in Table 1, the components other than insoluble sulfur and the vulcanization accelerator were kneaded at 150° C. for 4 minutes. The insoluble sulfur and the vulcanization accelerator were added to the obtained kneaded rubber and kneaded for 3 minutes at 80° C. to obtain the rubber composition.

A 215/45ZR 17 inch size run flat tire was prepared, in which a lining strip layer comprising the rubber compositions of Examples and Comparative Examples was positioned on the inside of the sidewall as the reinforcing rubber layer, and the following evaluations were conducted.

<Strength at Break ($T_B$)>

A sheet of 2 mm thickness was cut out from the lining strip layer of the run flat tire and $T_B$ (MPa) was evaluated according to JIS K6251.

<$E''/(E^*)^2$>

Loss modulus ($E''$) and complex modulus ($E^*$) were measured using a viscoelasticity spectrometer made by Iwamoto Corporation under temperature of 70° C., initial strain of 10%, dynamic strain of ±1% and frequency of 10 Hz and $E''/(E^*)^2$ was calculated.

<Run Flat Performance>

The tire having inner air pressure of 0 kPa was run on a drum at a speed of 80 km/h and the distance run until the tire was broken was compared. The distance was represented as an index based on Comparative Example 1 (100). The larger the number value is the better the run flat durability.

The evaluation results are shown in Table 1.

TABLE 1

|  | Ex. | | Com. Ex. | |
| --- | --- | --- | --- | --- |
|  | 1 | 2 | 1 | 2 |
| Composition (parts by weight) | | | | |
| NR | 60 | 40 | 80 | 25 |
| BR1 | 20 | 20 | 15 | 20 |
| BR2 | 20 | 40 | 5 | 55 |
| Carbon black FEF | 50 | 50 | 50 | 50 |
| Sericite | 30 | 30 | 30 | 30 |
| Stearic acid | 2 | 2 | 2 | 2 |
| Zinc oxide | 3 | 3 | 3 | 3 |
| Antioxidant | 1 | 1 | 1 | 1 |
| Silane coupling agent | 3 | 3 | 3 | 3 |
| Insoluble sulfur | 5 | 5 | 5 | 5 |
| Vulcanization accelerator | 2 | 2 | 2 | 2 |
| Evaluation results | | | | |
| $T_B$ (MPa) | 13.8 | 11.2 | 14.1 | 9.4 |
| $E''/(E^*)^2$ ($10^{-9}$ $Pa^{-1}$) | 6.5 | 6.1 | 7.1 | 5.9 |
| Run flat performance | 138 | 142 | 100 | 93 |

According to the present invention, by compounding star-shaped solution polymerization butadiene rubber which is coupled by tin tetrachloride, a specific carbon black and a vulcanizing agent in a rubber composition for a tire, both low heat generating properties and high hardness can be achieved. Also, by using the rubber composition as the reinforcing rubber layer of the sidewall of a run flat tire, run flat durability can be improved.

What is claimed is:

1. A run flat tire having a sidewall with a reinforcing rubber layer formed from a rubber composition comprising
   10 to 100 parts by weight of carbon black having nitrogen-adsorbing specific surface area of 30 to 100 m2/g and dibutyl phthalate oil absorption of at least 50 ml/100 g,
   at least 2 parts by weight of a vulcanizing agent, and
   at least one mica selected from the group consisting of kaolinite, sericite, phlogopite and muscovite,
   based on 100 parts by weight of a rubber component containing 10 to 50% by weight of star-shaped solution polymerization butadiene rubber;
   wherein said solution polymerization butadiene rubber has a vinyl bond amount of 5 to 20% by weight, coupling ratio by tin tetrachloride of at least 25% and molecular weight distribution of 1.2 to 3.

2. The run flat tire of claim 1, wherein said mica is present in an amount of at least 5 parts by weight based on 100 parts by weight of the rubber component.

3. The run flat tire of claim 1, wherein said mica is present in an amount of at least 10 parts by weight based on 100 parts by weight of the rubber component.

4. The run flat tire of claim 1, wherein said mica is present in an amount of at least 10 parts by weight based on 80 parts by weight of the rubber component.

5. The run flat tire of claim 2, wherein the mica has an average particle size of at least 2 μm to at most 30 μm.

6. The run flat tire of claim 2, wherein the mica has an average particle size of least 5 μm to at most 30 μm.

7. The run flat tire of claim 2, wherein the mica has an average particle size of least 10 μm to at most 20 μm.

8. The run flat tire of claim 1, wherein the coupling ratio by tin tetrachloride is at least 30% and at most 60%.

9. The run flat tire of claim 1, wherein the contain of the star-shaped solution polymerization butadiene rubber is at least 15% by weight and at most 40% by weight.

10. The run flat tire of claim 1, wherein the carbon black is present in an amount of 20 to 70 parts by weight based on 100 parts by weight of the rubber component.

11. The run flat tire of claim 1, wherein the carbon black is present in an amount of 30 to 60 parts by weight based on 100 parts by weight of the rubber component.

* * * * *